United States Patent Office 3,081,605
Patented Mar. 19, 1963

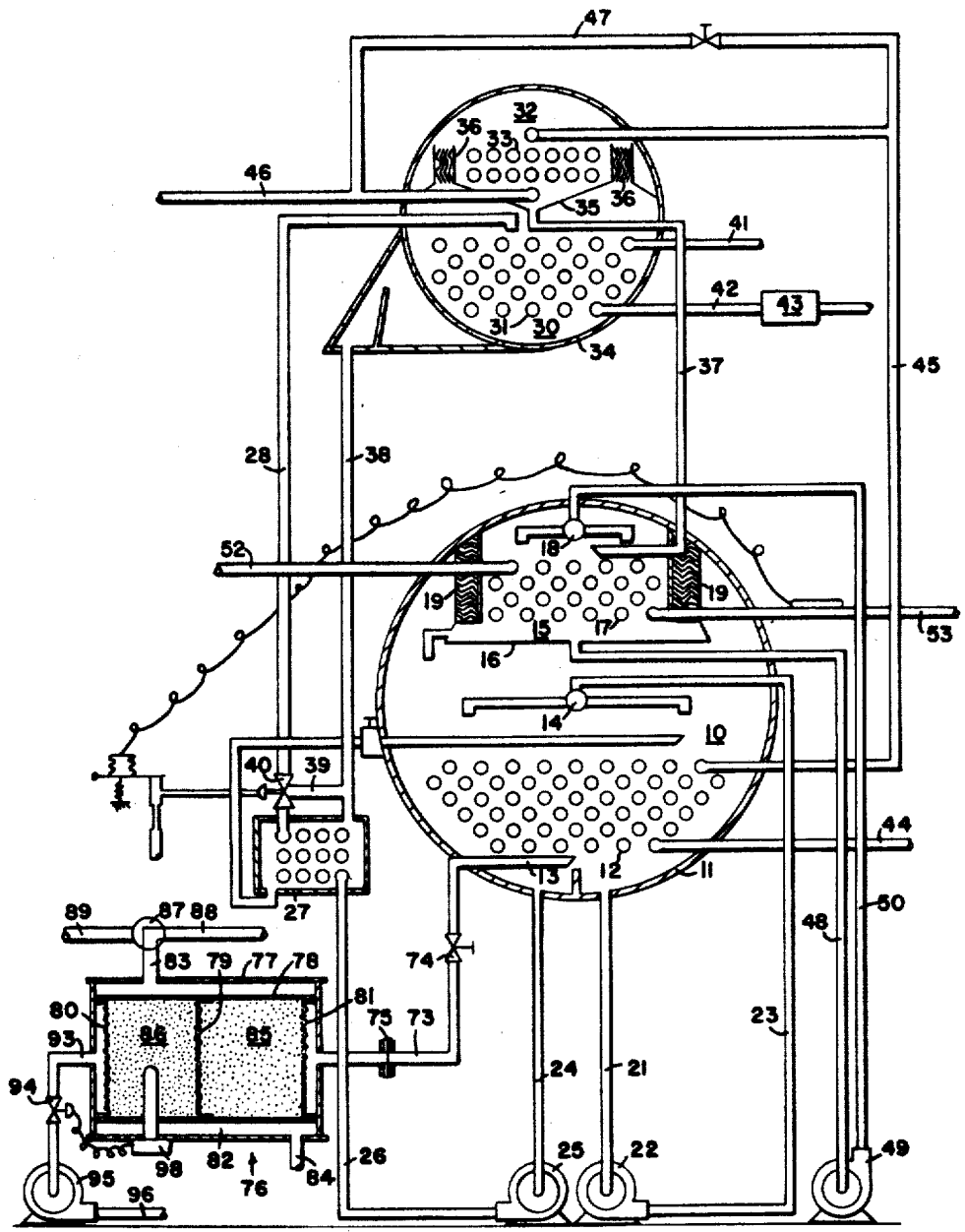

3,081,605
ABSORPTION REFRIGERATION SYSTEMS
Louis H. Leonard, Jr., Dewitt, N.Y., assignor to Carrier Corporation, Syracuse, N.Y., a corporation of Delaware
Filed Dec. 27, 1960, Ser. No. 78,540
14 Claims. (Cl. 62—85)

This invention relates to refrigeration systems and more particularly to an absorption refrigeration system having an improved purge arrangement.

Absorption refrigeration systems generally comprise a generator, a condenser, an evaporator, and an absorber section operatively connected to form a refrigeration system. The absorber section contains an absorbent solution for absorption of refrigerant vapor. The evaporator section is in communication with the absorber section and contains a liquid refrigerant. The liquid refrigerant vaporizes or evaporates in the evaporator and the refrigerant vapor passes to the absorber where it is absorbed. Vaporization of refrigerant in the evaporator results in cooling of the remaining refrigerant and this cooling effect is utilized either directly or indirectly to provide refrigeration or cooling at any desired remote location through the use of suitable heat exchangers.

In order for an absorption refrigeration system of the type described to operate effectively and to exhibit adequate refrigeration capacity, it has been found necessary to remove substantially all noncondensible vapors which tend to accumulate in the absorber region. The presence of even a relatively small quantity of noncondensible vapors in the absorber tends to blanket the absorbent solution and substantially reduce the quantity of refrigerant vapor which is absorbed. If the capacity of the absorbent solution to absorb refrigerant vapor is thereby reduced, the pressure in the absorber and hence, in the evaporator, tends to rise slightly and the evaporation of refrigerant and cooling capacity is consequently reduced. These noncondensible gases may be present in the refrigerant machine due to leaks or decomposition of water due to corrosion reactions occurring within the machine.

Various purge arrangements for removing noncondensible gases from a refrigeration machine are known to the art, but one of the simplest and least expensive arrangements involves the use of a vacuum pump to remove the noncondensibles. When using a vacuum pump to purge an absorption refrigeration machine, a purge valve is placed in series with the purge pump and the absorber section of the refrigeration machine in order to prevent air from escaping into the absorber section when the pump is not in operation. However, there is the danger in using this type of system that the vacuum pump may cease operation or operate improperly at times when the purge valve is not closed to protect the absorber. For example, an operator may forget to close the purge valve before he shuts off the purge pump. Furthermore, power failure, accident or malfunction of the pump may result in the pump's ceasing operation or operating in an ineffective manner at times when the purge valve is open.

The danger involved in operation of the absorption refrigeration system while the purge pump is malfunctioning and the purge valve is open does not merely lie in the entrance of noncondensible gases into the absorber and the consequent temporary reduction in the capacity of the system. Instead, the chief danger lies in the fact that as the air is sucked into the absorber through the purge pump, a quantity of the lubricating oil in the pump may also be drawn into the absorber. The presence of even small quantities of lubricating oil in the absorber or evaporator and solution heat exchanger seriously impairs the operation of the refrigeration machine and greatly reduces its capacity. The damage to the absorption refrigeration system caused by the oil can only be repaired by chemically or mechanically cleaning the interior of the machine. At best, chemical cleaning is a very expensive process and in many cases, it is necessary to disassemble the absorber to mechanically clean its parts of the lubricating oil before it will again operate properly.

In addition, it is frequent practice to add a quantity of octyl alcohol (2-ethyl-n-hexanol) to an absorption refrigeration system in order to improve the performance of the absorber and condenser and to increase the capacity of the system. Octyl alcohol is volatile, it exists partially in a vapor state in the absorber. Therefore, the octyl alcohol vapor will be removed by the purge pump. Removal of the octyl alcohol is disadvantageous since it is desirable that it remain in the refrigeration system and periodic replacement is therefore necessary.

Furthermore, the octyl alcohol vapor tends to dilute the lubricating oil in the vacuum purge pump causing the oil to lose its lubricating properties, even though there appears to be sufficient oil for proper operation of the pump. This loss of lubricity in time, results in excessive wear of the pump bearings and eventual deterioration performance and failure of the pump. The result is that the pump has to be replaced at intervals in a purge system utilizing octyl alcohol in the absorber raising the cost of operation thereof. Also, the effects mentioned previously resulting from accidental failure of the pump, may occur requiring cleaning of the interior of the absorption machine in the event that lubricating oil escapes into the machine from the malfunctioning pump.

Furthermore, a vacuum purge pump not only exhausts noncondensible gases which it is desired to remove from the refrigeration system, but it also removes condensible gases such as refrigerant vapor which it is desired to retain within the system. In some cases, the exhausting of refrigerant fumes may be hazardous to health or otherwise restricted. In other cases, the refrigerant vapor itself tends to dilute the oil supply of the vacuum purge pump rendering its operation ineffective by injuring the bearings of the pump. In either event, the loss of refrigerant from the system is highly undesirable since it requires frequent replenishment of the refrigerant to replace the unknown quantity which has been lost from the system.

Accordingly, it is an object of this invention to provide an absorption refrigeration system embodying an improved purge arrangement.

It is a further object of this invention to provide an improved absorption refrigeration system.

It is a further object of this invention to provide an improved purge unit and method of purging a refrigeration system.

These and other objects are achieved, in the illustrated embodiment by the provision of an absorption refrigeration system having a novel purge arrangement. An absorber, an evaporator, a condenser and a generator section are operatively connected to form an absorption refrigeration machine. A purge line having a purge valve therein extends from the absorber section to a canister. The canister is filled with an adsorbent medium such as activated charcoal and silica gel. The adsorbent medium in the canister is selected to adsorb condensible vapors such as refrigerant and octyl alcohol which would normally be exhausted to the atmosphere in an ordinary vacuum pump purge arrangement. Noncondensible gases passing through the purge arrangement are exhausted from the refrigeration system by a purge pump located downstream of the canister. A purge valve is located between the purge pump and the canister on its downstream side. Periodically, the purge valve may be closed and heat may be supplied to drive the adsorbed vapors from the adsorbent material in the canister and return them to the absorber of the refrigeration system. This operation serves to regenerate the adsorptive capabilities of the material within the canister as well as serving to recover condensibles such as refrigerant and octyl alcohol which are desired to remain in the refrigeration system. Furthermore, since octyl alcohol and refrigerant are trapped in the absorbent medium during purging, the oil supply of the purge pump is not endangered. In the event the purge pump is accidentally shut off or its functioning impaired while the purge valve remains open, the adsorbent medium in the canister prevents the escape of oil into the absorber of the refrigeration system and consequently, protects its operation.

These and other objects of this invention will become apparent by reference to the following specification and attached drawing wherein:

The figure is a diagrammatic view of an absorption refrigeration machine embodying an improved purge arrangement.

Referring particularly to the drawing, there is shown an absorption refrigeration machine comprising an absorber section 10 within a shell 11. A plurality of heat exchange tubes 12 are provided within the absorber section. A purge line 13 leads from a suitable region of the absorber and serves to conduct noncondensible gases therefrom. A spray system 14 is located above the absorber section.

Also disposed in shell 11 is an evaporator section 15 comprising a pan-like member 16 within which is disposed a plurality of heat exchange tubes 17. A spray system 18 is located above heat exchange tubes 17. A plurality of eliminators 19 are provided to prevent escape of entrained refrigerant from evaporator section 15 to absorber section 10.

Line 21 is connected to pump 22 and serves to forward absorbent solution of intermediate strength from the lower portion of absorber section 10 through line 23 to spray system 14 in order to recirculate absorbent solution in the absorber. A line 24 leads from a lower portion of absorber section 10 containing weak solution and pump 25 serves to pass the weak solution through line 26 and solution heat exchanger 27 through line 28 to generator section 30.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution.

A suitable absorbent for a refrigeration system of the type described is a solution of lithium bromide and water. The concentration of the strong solution leaving the generator may be about 65%. A suitable refrigerant is water. An additive such as octyl alcohol (2-ethyl-n-hexanol) may be added to the system to increase heat transfer in the condenser and absorber and consequently improve the preformance and capacity of the refrigeration system.

Generator section 30 is located in shell 34 and comprises a plurality of heat exchange tubes 31 for passing steam. Also located within shell 34 is condenser section 32 comprising a pan-like member 35 within which are disposed a plurality of heat exchange tubes 33 for passing cooling water. Eliminators 36 are provided to prevent strong solution from being entrained in refrigerant vapor passed from generator section 30 to condenser section 32.

A line 37 leads from pan-like member 35 to evaporator section 15 and serves to return condensed refrigerant from the condenser section to the evaporator section. Line 38 extends from generator section 30 through solution heat exchanger 27 to absorber section 10 and serves to return hot, strong absorbent solution from the generator section to the absorber section while passing it in heat exchange relation with cool, weak solution being forwarded to the generator for concentration thereof.

A bypass line 39 and bypass valve 40 having a suitable actuator mechanism may be provided for capacity control of the refrigeration system. Reference is made to Leonard application Serial No. 2,203, filed January 13, 1960, for a complete description of the operation of an absorption refrigeration machine including the operation of bypass line 39 and bypass valve 40.

A steam inlet line 41 and outlet line 42 having suitable steam trap 43 is provided to admit steam to heat exchange tubes 31 in order to boil off refrigerant vapor from weak solution supplied to the generator, in order to concentrate the weak solution. It will be understood that the vaporized refrigerant passes through eliminators 36 and is condensed in condenser 32. A cooling water inlet line 44 is connected to heat exchange tubes 12 in absorber section 10 from which the cooling water passes through line 45 to heat exchange tubes 33 in the condenser section. The cooling water is then discharged through line 46 and appropriate bypass line and valve 47 may be provided to bypass cooling water around the condenser section, if desired. The cooling water serves to remove the heat of dilution and condensation from the absorbent solution in absorber section 10 and serves to remove the heat of vaporization to condense refrigerant vapor in condenser section 32.

A suitable recirculation line 48 and recirculation pump 49 pass refrigerant from pan 16 of the evaporator section through line 50 to spray system 18 so that refrigerant may be sprayed over heat exchange tubes 17 to wet them and aid in evaporation of refrigerant and cooling of heat exchange tubes 17. Lines 52 and 53 serve to conduct a heat exchange fluid which is cooled by passage through heat exchange tubes 17 and the resulting heat exchange with the cooled refrigerant. This cooled heat exchange fluid is then passed to suitable remotely located heat exchangers to provide cooling in the desired areas.

While the utility and operation of this invention will be described with particular reference to an absorption refrigeration system with which it is especially adapted for use, it is to be understood that shell 11 could comprise a component of other types of regrigeration systems such as a centrifugal refrigeration machine.

It is desirable to locate the purge line at a point of maximum accumulation of noncondensible gases. In an absorption refrigeration machine, this point is generally below tube bundle 12 due to the fact that this is the lowest pressure region of the machine.

As has been previously explained, it is necessary to rid the interior of the absorption machine of virtually all traces of noncondensible gases because, even in small quantities, they tend to significantly impair proper operation of the machine by greatly reducing the capacity of the machine. Such noncondensibles may be present either because they were not initially pumped out of the machine or because of air leaking into the machine during operation or because they are generated in the machine as for example, by the decomposition of water.

Purge line 13 leads through isolation valve 74 to the purge unit. Means 75 such as a pair of pipe flanges are provided for disconnecting the purge unit from refrigeration machine 10 downstream of isolation valve 74 in the event that it becomes necessary to replace the purge unit.

Purge unit comprises a canister 76 which may have an outer shell 77 and an inner shell 78. Inner shell 78 is divided into two compartments by means 79 which may consist of a Monel metal wire cloth. In addition, similar end screens 80 and 81 may be provided adjacent the ends of the purge unit. between inner shell 78 and outer shell 77 may be provided a space 82 which comprises means to pass a heat exchange fluid such as water, air or steam. Inlet pipe 83 leads into space 82 and outlet pipe 84 extends from it for conducting the particular heat exchange fluid which is employed. In the event that it is desired to both cool and heat the contents of canister 76, a three-way valve 87 may be provided which alternately connects hot water or other fluid line 88 or cold water line 89 to space 82 through inlet 83. Alternately, canister 76 may be electrically heated by imbedding a suitable electrical resistence element in the adsorbent medium. Likewise, the canister may be cooled merely by natural heat transfer with ambient air and if desired, external fins may be provided to aid heat transfer with the atmosphere. When other heating and cooling means are provided, outer shell 77 may be omitted, if desired.

The interior of inner shell 78 of canister 76 is divided into two compartments by wire cloth 79 as previously described. Upstream compartment 85 is preferably filled with silica gel and downstream compartment 86 may be filled with activated charcoal. Silica gel is well known for its ability to adsorb water vapor and activated charcoal is well known for its ability to adsorb octyl alcohol vapor. Both silica gel and activated charcoal will adsorb substantial quantities of oil should the same become necessary. It will be understood that the two materials described are merely given for purposes of illustration and that other adsorbent materials may be employed depending upon the refrigerant which is used and other conditions such as the type of additives and noncondensibles present. Neither silica gel nor activated charcoal display a great affinity for noncondensible gases or vapors such as air. It may, therefore, be said that these adsorbent materials display a preferential affinity for condensible gases such as water and alcohol vapor.

Downstream of canister 76, purge line 93 leads through purge valve 94 into a vacuum or purge pump 95 which may be of the oil lubricated type. A purge discharge line 96 leads from the high pressure side of purge pump 95 for the purpose of exhausting noncondensible gases to the atmosphere. The low pressure side of purge pump 95 is connected to canister 76 so as to draw the noncondensible gases out of the canister as well as to draw a mixture of condensible and noncondensible gases from absorber 11 into the canister.

A thermostat 98 may be located within canister 76 to prevent opening of purge valve 94 in the event that the contents of canister 76 are at too high a temperature to permit efficient adsorption of condensible gases.

In operation, purge pump 95 is turned on by some suitable means (not shown). Purge pump 95 withdraws a mixture of condensible water and alcohol vapor and noncondensible gases such as air from the lower portion of absorber 11 where they tend to accumulate. This mixture of gases is then contacted by the adsorbent medium in canister 76. The silica gel in compartment 85 adsorbs the water vapor constituent of the mixture of gases removed from the absorber on contact therewith. The activated charcoal in compartment 86 adsorbs the octyl alcohol vapor constituent of the mixture of gases passing through canister 76 and also any unadsorbed water vapor which may have passed into compartment 86. The unadsorbed noncondensible gases pass completely through canister 76 and are discharged through purge discharge line 96 by pump 95. Substantially all of the noncondensible gases withdrawn from absorber 11 are discharged through line 96 and substantially all of the condensible gases such as refrigerant and alcohol vapor are trapped in canister 76 due to the preferential affinity of the adsorbent material in the canister for the condensible gases.

After a period of time has elapsed during which the purging has taken place to a satisfactory degree, purge valve 94 is closed to seal communication between canister 76 and ambient atmosphere while valve 74 remains open. Purge pump 95 may be shut off if desired. Valve 87 is then rotated to a position to admit hot water or other heating medium through hot water line 88 into space 82 provided between inner shell 78 and outer shell 77. This hot water serves to heat up the adsorptive medium in canister 76 and causes it to liberate its adsorbed vapors. Since absorber 11 of the refrigeration machine is at a relatively low pressure at all times, these adsorbed condensible vapors are returned to the absorber where they again assume their proper functions in the refrigeration cycle. It will be seen, therefore, that loss of refrigerant and alcohol charge in the absorption refrigeration machine is reduced to a minimum by the purge unit herein described.

After a suitable period of time during which the adsorbent medium in canister 76 has been reactivated, the supply of heating fluid to space 82 is discontinued and purge pump 95 and purge valve 94 may then be opened for repurging of refrigeration machine 10. If desired, cold water or other cooling medium may be supplied through line 89 to space 82 by proper positioning of valve 87 to increase the adsorptive capabilities of the material within canister 76.

In the event of a malfunction of pump 95 such that the low pressure in absorber 11 causes a back flow of air and oil through pump 95 toward the absorber, the adsorbent material in canister 76 will serve to prevent the entrance of oil through purge line 13 into absorber 11. Consequently, absorber 11 is protected from the extremely deleterious effects of oil entering therein should purge pump 95 fail for any reason. By means of flanges 75, the entire purge unit may be disconnected from the refrigeration machine 10 and replaced with a new purge unit should malfunction of pump 95 be experienced.

It will be observed that by the method and apparatus herein described, a simple and relatively inexpensive method of purging and apparatus has been provided which is capable of selectively passing undesired noncondensible vapors while at the same time retaining condensible vapors such as refrigerant, alcohol and the like in the purge unit for subsequent return to the refrigeration machine. Consequently, by utilization of this apparatus, the refrigerant and alcohol charge in a refrigeration system embodying this invention is conserved and the danger of flooding an absorber with oil by malfunction of a purge pump is greatly reduced. In addition, dilution of the lubricating oil supply of the purge pump is effectively prevented by trapping octyl alcohol vapor in the purge unit and consequently, the problems of malfunction of the pump due to lack of proper lubrication are substantially overcome.

While there has been described a preferred embodiment, this invention is not limited thereto but other modifications and embodiments within the scope of the following claims will occcur to those skilled in the art.

I claim:

1. An absorption refrigeration machine containing refrigerant and having a relatively low pressure absorber section in which noncondensible gases tend to accumulate, an absorbent solution in said absorber, a charge of octyl alcohol in said absorber, a purge line leading from said absorber, an oil lubricated vacuum pump connected with said purge line to withdraw the noncondensible gases from said absorber and discharge them from the system, and an adsorptive medium located in said purge line between said absorber and said vacuum pump, said adsorptive medium having a relatively greater affinity for octyl alcohol vapor than for noncondensible gases so that octyl alcohol vapor is retained in said system and prevented from diluting the lubrication oil of said vacuum pump while noncondensible gases such as air are discharged from said refrigeration system.

2. A refrigeration system as defined in claim 1 further including means to close communication between said adsorptive medium and ambient atmosphere while maintaining communication between said adsorbent medium and the absorber of said refrigeration machine, and means to heat said adsorbent medium to drive off adsorbed octyl alcohol vapor and return the same to the absorber section of the refrigeration system due to the relatively low pressure maintained therein.

3. In an absorption refrigeration machine containing a refrigerant and having an absorber section with a mixture of an absorbent solution and octyl alcohol therein, the combination therewith of a purge unit comprising a canister containing an adsorptive medium having a preferential affinity for refrigerant and octyl alcohol vapor, means communicating the interior of said absorber with said purge unit and an oil lubricated pump means to pass noncondensible gases from said absorber in contact with said adsorptive medium and thence discharge the noncondensibles from said purge unit, said adsorptive medium serving to trap refrigerant and octyl alcohol vapors removed from the absorber and prevent their removal from the refrigeration system.

4. An absorption refrigeration machine as defined in claim 3 wherein said adsorptive medium comprises a serially disposed quantity of silica gel and activated charcoal.

5. An absorption refrigeration machine as defined in claim 3 wherein said silica gel is disposed ahead of said activated charcoal so that gases removed from said absorber first contact said silica gel and then contact said activated charcoal.

6. An absorption refrigeration machine as defined in claim 3 including means to seal said canister from the entrance of ambient air upon discontinuance of operation of said pump means, and heating means to drive off adsorbed condensible vapors from said adsorbent medium for return of said vapors to said absorber through said communicating means.

7. In an absorption refrigeration system adapted to contain a refrigerant, and absorbent solution, and octyl alcohol; the combination of an absorber section, a canister in communication with said absorber section, an adsorbent medium in said canister adapted to contact and adsorb refrigerant vapor passing through said canister, a second adsorbent medium in said canister adapted to contact and adsorb octyl alcohol vapor passing through said canister, one of said adsorbent media being also adapted to adsorb oil, an oil lubricated vacuum pump having a low pressure side connected with said canister and adapted to remove gases from said absorber through said canister and thence through said pump and to discharge the unadsorbed gases from the refrigeration system, means to seal communication between said canister and said pump, means to heat said adsorbent media in said canister to drive off refrigerant and octyl alcohol adsorbed thereby and return the same to the absorber, said adsorbent media serving to trap refrigerant and octyl alcohol while passing noncondensible gases therethrough so that said pump serves to purge the absorber of noncondensible gases, and at least said one of said adsorbent media additionally serving to protect the absorber from the entrance of oil therein in the event of malfunction of said pump.

8. A method of protecting an oil lubricated vacuum purge pump in an absorption refrigeration system of the type employing octyl alcohol as an additive in the absorber section thereof while purging noncondensible gases from the system, comprising the steps of withdrawing a mixture of noncondensible gases and octyl alcohol vapor from said absorber section, contacting said mixture of gases withdrawn from said absorber with an adsorbent medium having a preferential affinity for the octyl alcohol vapor, and discharging through said pump the unadsorbed noncondensible gases.

9. A method as defined in claim 8 including the additional steps of sealing communication between said adsorbent medium and ambient atmosphere, heating said adsorbent medium to drive off the adsorbed octyl alcohol vapor and returning the octyl alcohol vapor to the absorber section of the refrigeration machine.

10. In an absorption refrigeration system comprising an absorber, a condenser, a generator, and an evaporator connected to form a refrigeration circuit, a purge unit, means to pass a mixture of condensible and relatively noncondensible vapor from said refrigeration circuit to said purge unit, means to separate the condensible vapor from the relatively noncondensible vapor in said purge unit including means to contact an adsorbent medium having a preferential affinity for condensible vapor with the mixture of said vapors passed to said purge unit, means to pass the unabsorbed vapor from the purge unit and to exhaust it from the refrigeration system, the means to periodically heat the adsorbent medium to return the adsorbed vapor to the refrigeration system and to regenerate the adsorbent properties of said adsorbent medium for reuse thereof.

11. A purge unit for removing relatively noncondensible gases from a refrigeration system, said purge unit comprising a plurality of adsorbent media having a preferential affinity for condensible gases, means to pass gas withdrawn from a portion from said refrigeration system into contact with said adsorbent media in said purge unit to adsorb said condensible gases while passing said relatively noncondensible gases therethrough, and means to discharge unadsorbed gases from said system.

12. A purge unit as defined in claim 11 wherein said refrigeration system is of the type employing water as a refrigerant and having a charge of octyl alcohol therein, wherein said adsorbent media comprise silica gel and activated charcoal.

13. A method of purging relatively noncondensible gases from an absorption refrigeration machine of the type utilizing a refrigerant and having octyl alcohol therein, which comprises the steps of withdrawing a quantity of vapor from the absorber section of said refrigeration machine, contacting said quantity of vapor with an adsorbent material having a preferential affinity for refrigerant vapor and octyl alcohol vapor, and discharging the remaining noncondensible vapors from the system after extraction of refrigerant vapor and octyl alcohol vapor therefrom by said contacting step.

14. The method as defined by claim 13 including the further step of closing communication between said adsorbent material and the ambient atmosphere while maintaining communication between said adsorbent material and said absorber section, and heating said adsorbent material to pass off adsorbed refrigerant and octyl alcohol vapors from the adsorbent material back to the absorber section of said refrigeration machine.

References Cited in the file of this patent

UNITED STATES PATENTS

| | | |
|---|---|---|
| 1,729,081 | Miller | Sept. 24, 1929 |
| 2,765,634 | Whitlow | Oct. 9, 1956 |

UNITED STATES PATENT OFFICE
CERTIFICATE OF CORRECTION

Patent No. 3,081,605                                 March 19, 1963

Louis H. Leonard, Jr.

It is hereby certified that error appears in the above numbered patent requiring correction and that the said Letters Patent should read as corrected below.

Column 1, lines 39 and 40, for "refrigerant" read -- refrigeration --; column 3, line 7, for "absorbent" read -- adsorbent --; line 57, for "preformance" read -- performance --; column 4, line 43, for "regrigeration" read -- refrigeration --; line 70, for "between" read -- Between --; column 8, line 20, for "the", second occurrence, read -- and --.

Signed and sealed this 31st day of March 1964.

(SEAL)
Attest:
ERNEST W. SWIDER

Attesting Officer

EDWARD J. BRENNER

Commissioner of Patents

UNITED STATES PATENT OFFICE
CERTIFICATE OF CORRECTION

Patent No. 3,081,605                          March 19, 1963

Louis H. Leonard, Jr.

It is hereby certified that error appears in the above numbered patent requiring correction and that the said Letters Patent should read as corrected below.

Column 1, lines 39 and 40, for "refrigerant" read -- refrigeration --; column 3, line 7, for "absorbent" read -- adsorbent --; line 57, for "preformance" read -- performance --; column 4, line 43, for "regrigeration" read -- refrigeration --; line 70, for "between" read -- Between --; column 8, line 20, for "the", second occurrence, read -- and --.

Signed and sealed this 31st day of March 1964.

(SEAL)
Attest:
ERNEST W. SWIDER

Attesting Officer

EDWARD J. BRENNER

Commissioner of Patents